G. F. Blake,

Pulverizing Clay.

No 2,414. Reissued Dec. 11, 1866.

Witnesses:
Osborne Marsh
C. R. Ransbury

Inventor:
George F. Blake
by his Attorney
Chas. F. Ransbury

AM. PHOTO-LITHO. CO. N.Y. (OSBORNE'S PROCESS.)

United States Patent Office.

IMPROVED MACHINE FOR PULVERIZING CLAY.

GEO. F. BLAKE AND P. HUBBELL, OF BOSTON, MASSACHUSETTS ASSIGNEES OF GEORGE F. BLAKE.

*Letters Patent No.* 33,810, *dated November* 26, 1863; *reissue No.* 2,414, *dated December* 11, 1866.

The Schedule referred to in these Letters Patent and making part of the same.

TO ALL WHOM IT MAY CONCERN:

Be it known that GEORGE F. BLAKE, formerly of Medford, in the county of Middlesex, and State of Massachusetts, now of the city of Boston, in said State, did invent a new and useful Machine for Pulverizing and Cleaning Clay, and other plastic materials; and we do hereby declare the following to be a full and correct description of the same, reference being had to the accompanying drawings, in which—

Figure 5:
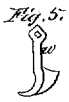
Figure 3:
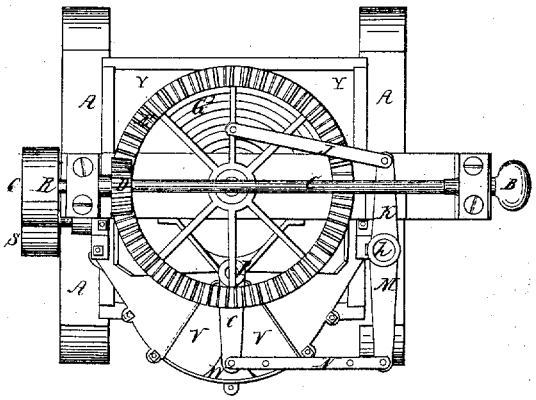
Figure 3 is a top view or plan.

Figure 5, a separate view of one of the stationary fingers.

The same part is indicated wherever it occurs by the same letter of reference.

The nature of the said invention consists in the construction, combination, and arrangement of the reciprocating wipe, revolving screen, and stationary fingers, and in the arrangement for conjoint operation of inclined blades or sweeps, with a stationary grating, all substantially in the manner and for the purpose hereinafter fully set forth.

Figure 1:
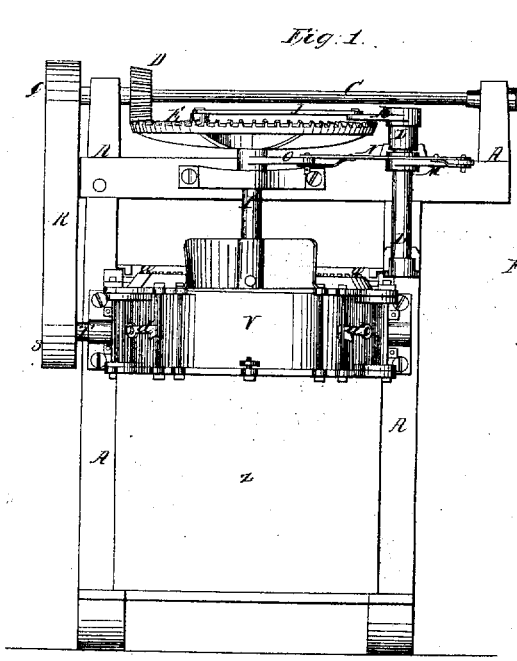
Figure 1 is a front elevation of the machine.
Figure 2:
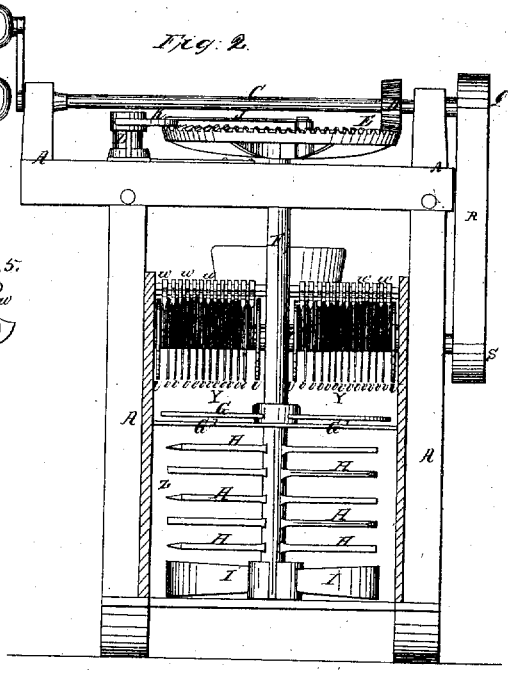
Figure 2 is a rear elevation of the same, the side of the box being removed to show the arrangement of machinery within.
Figure 4:
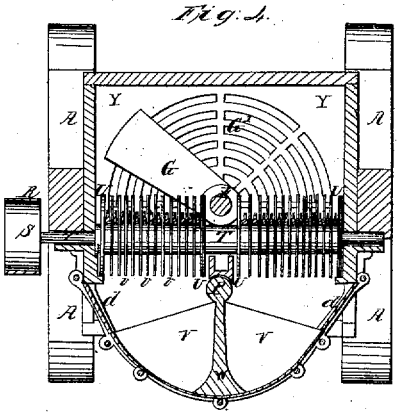
Figure 4 is a horizontal section through line *x x*, in figs. 1 and 2.

To enable others to make and use this improved clay pulverizer and cleanser, we will proceed to describe its construction and operation, referring to the drawings, whereon A marks a stout frame-work, which supports the machinery, and to which the sides of the clay-box or receptacle are firmly attached. B marks a crank, which indicates the point at which the moving power, of whatever character it may be, is applied to the horizontal shaft C; this shaft has on it a bevelled pinion, D, which engages the teeth of the bevel wheel E, on the top of the upright shaft F, which is the main shaft of the machine. To this shaft are attached inclined blades or sweeps, G, (see figs. 2 and 4) which pass over the horizontal stationary grating, G′, and press the clay, or other plastic material, through said grating into the pugging chamber Z, below it. To the main shaft, F, are also attached horizontal knives or pugging blades, H, fig. 2, and sweeps, I, the former of which cut and pug the clay, and the latter force it out at a lateral aperture in the lower portion of the mill. The arrangements of knives and sweeps in the lower chamber, Z, is that used in ordinary pug mills. A flat connecting rod, J, is pivoted at one end to a short upright on wheel E, and at the other to arm K, of vertical rock-shaft, L. This shaft vibrates in suitable bearings on the frame of the machine. It has a second arm, M, to which a connecting rod, N, is pivoted at one end, the other end being similarly attached to arm O, on the top of rock-shaft P. This shaft carries the reciprocating plunger or wipe, W, which works in the upper chamber, V. On the end of horizontal shaft, C; opposite to that to which the power is applied, is attached a pulley, Q, which, by means of a belt, R, drives pulley S on the end of horizontal grate-shaft T. This shaft carries four circular disks, U, and a number of circular knives, *v v*, which form what may be called a revolving grate, through which the clay is forced by the reciprocating wipe W into the middle chamber Y. Fig. 5 represents one of a series of fingers, *w*, of the peculiar shape shown, which are placed between the circular knives, *v*, of the revolving grate. They are supported on a square rod, which passes through an eye in their upper end, as shown in fig. 2. Their office is to remove the clay from the circular knives and keep them clear. Doors, *d*, are placed in either side of upper chamber, V, through which the stones, &c., which accumulate in front of the grate, may conveniently be removed.

The operation of the machine is as follows: The clay to be cleaned and pulverized is fed into the top of the upper chamber, V, on either side of the reciprocating wipe, W. By the operation of that wipe, the clay is pressed against and through the revolving grate into the middle chamber, Y, stones and other bulky impurities being detained by the grate in the upper chamber, whence they are removed through the side doors, *d*. The clay is thoroughly divided by the knives *v*, in its passage through the revolving grate. As those knives revolve they are cleared of adhering clay by the fingers *w*. From the middle chamber the clay is pressed down through a horizontal grate, G′, by the inclined sweeps, G, into the lowermost chamber or pug mill, Z, where it is subjected to the operation of blades of the ordinary form and mode of action, and delivered from the machine by the sweeps I in proper condition for the manufacture of bricks.

Having thus fully described this invention, what we claim as our invention, and desire to secure by Letters Patent, is—

1. In combination with a machine for cleaning and pulverizing clay or other plastic material, the reciprocating wipe or plunger, W, constructed and operating substantially as described.

2. The revolving grate, constructed and operating as described.

3. The stationary fingers *w*, constructed, arranged, and operating as set forth.

4. The arrangement for conjoint operation of the inclined blades or sweeps, G, with the horizontal grate G′, in the manner described.

5. We claim the arrangement for conjoint operation of reciprocating, oscillating, or rotating wipes, blades, or sweeps, with rotating or stationary screens or gratings, substantially in the manner and for the purpose set forth.

The above specification of the said invention, signed and witnessed at Boston this 5th day of September, A. D. 1866.

GEORGE F. BLAKE,
PETER HUBBELL.

Witnesses:
JOB A. TURNER,
R. S. WADE.